(12) United States Patent
Eiteneer et al.

(10) Patent No.: US 7,837,962 B2
(45) Date of Patent: Nov. 23, 2010

(54) METHOD AND APPARATUS FOR REMOVING MERCURY AND PARTICULATES FROM COMBUSTION EXHAUST GAS

(75) Inventors: Boris Nikolaevich Eiteneer, Irvine, CA (US); Robert Warren Taylor, Ponte Verda Beach, FL (US); Vitali Lissianski, San Juan Capo, CA (US); James Easel Roberts, Kansas City, MO (US)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 12/054,149

(22) Filed: Mar. 24, 2008

(65) Prior Publication Data

US 2009/0235848 A1 Sep. 24, 2009

(51) Int. Cl.
*B01D 53/34* (2006.01)
*B01D 53/64* (2006.01)
*B01D 53/74* (2006.01)
*B01D 37/00* (2006.01)

(52) U.S. Cl. .................. 423/210; 423/215.5; 95/134; 110/203; 110/216; 110/217; 110/233; 110/322; 110/345; 422/168; 422/169; 422/170; 422/171; 422/172; 422/177; 422/187

(58) Field of Classification Search .................. 95/134; 423/210, 215.5; 110/203, 216, 217, 233, 110/322, 345; 422/168–172, 177, 187
See application file for complete search history.

(56) References Cited

U.S. PATENT DOCUMENTS

| 5,456,891 | A | | 10/1995 | Fattinger et al. |
| 5,507,238 | A | * | 4/1996 | Knowles ............... 110/245 |
| 5,569,436 | A | | 10/1996 | Lerner |
| 5,672,323 | A | | 9/1997 | Bhat et al. |
| 5,827,352 | A | | 10/1998 | Altman et al. |
| 6,027,551 | A | | 2/2000 | Hwang et al. |
| 6,136,281 | A | | 10/2000 | Meischen et al. |

(Continued)

FOREIGN PATENT DOCUMENTS

GB 2448030 A 10/2008

OTHER PUBLICATIONS

An International Search Report, dated Aug. 6, 2009, for co-pending International Application No. GB0904714.3 (3 pages).

*Primary Examiner*—Timothy C Vanoy
(74) *Attorney, Agent, or Firm*—Armstrong Teasdale LLP

(57) ABSTRACT

A method of reducing particulate matter and mercury emissions in a combustion flue gas includes, in an exemplary embodiment, combusting a fuel resulting in generation a flue gas flow, cooling the flue gas flow within a duct, positioning a flow conditioning apparatus within the duct, enhancing a reaction rate of the mercury and carbon-containing fly ash particles by directing the flue gas flow through the flow conditioning apparatus to mix the carbon-containing fly ash particles and mercury within the flue gas flow and to facilitate at least one of oxidation of the mercury and binding the mercury to the carbon-containing fly ash particles, collecting a portion of the carbon-containing fly ash particles in the flow conditioning apparatus, and directing the flue gas flow to a particulate collection device to remove the remaining portion of the fly ash particles from flue gas flow.

20 Claims, 1 Drawing Sheet

U.S. PATENT DOCUMENTS

| | | |
|---|---|---|
| 6,206,685 B1 | 3/2001 | Zamansky et al. |
| 6,280,695 B1 | 8/2001 | Lissianski et al. |
| 6,284,199 B1 | 9/2001 | Downs et al. |
| 6,375,909 B1 | 4/2002 | Dangtran et al. |
| 6,439,138 B1 | 8/2002 | Teller et al. |
| 6,451,094 B1 | 9/2002 | Chang et al. |
| 6,471,506 B1 | 10/2002 | Zamansky et al. |
| 6,503,470 B1 | 1/2003 | Nolan et al. |
| 6,521,021 B1 | 2/2003 | Pennline et al. |
| 6,524,371 B2 | 2/2003 | El-Shoubary et al. |
| 6,528,030 B2 | 3/2003 | Madden et al. |
| 6,533,842 B1 | 3/2003 | Maes et al. |
| 6,534,024 B2 | 3/2003 | Honjo et al. |
| 6,595,147 B2 | 7/2003 | Teller et al. |
| 6,604,474 B2 | 8/2003 | Zamansky et al. |
| 6,694,900 B2 | 2/2004 | Lissianski et al. |
| 6,726,888 B2 | 4/2004 | Lanier et al. |
| 6,863,005 B2 | 3/2005 | Lanier et al. |
| 6,895,875 B1 | 5/2005 | Lissianski et al. |
| 6,981,456 B2 | 1/2006 | Lissianski et al. |
| 7,429,365 B2 * | 9/2008 | Taylor ........................ 423/210 |
| 2001/0007647 A1 | 7/2001 | Honjo et al. |
| 2002/0117094 A1 | 8/2002 | Teller et al. |
| 2003/0047440 A1 | 3/2003 | Granite et al. |
| 2003/0206843 A1 | 11/2003 | Nelson, Jr. |
| 2005/0036926 A1 | 2/2005 | Lissianski et al. |
| 2005/0106516 A1 | 5/2005 | Payne et al. |
| 2005/0129600 A1 | 6/2005 | Lanier et al. |
| 2005/0147549 A1 | 7/2005 | Lissianski et al. |
| 2005/0274307 A1 | 12/2005 | Lissianski et al. |
| 2006/0021554 A1 | 2/2006 | Lissianski et al. |

* cited by examiner

METHOD AND APPARATUS FOR REMOVING MERCURY AND PARTICULATES FROM COMBUSTION EXHAUST GAS

BACKGROUND OF THE INVENTION

The field of the invention relates generally to combustion furnaces, and more particularly, to a method and apparatus to reduce emissions of trace elements and particulate matter from a combustion furnace flue gas.

During a typical combustion process within a furnace or boiler, for example, a flow of combustion exhaust gas, or flue gas, is produced. Known combustion exhaust gases contain combustion products including, but not limited to, carbon, fly ash, carbon dioxide, carbon monoxide, water, hydrogen, nitrogen, sulfur, chlorine, and/or trace metals, for example, mercury, generated as a result of combusting solid and/or liquid fossil fuels.

Volatile metal mercury is one air pollutant produced through coal combustion. Mercury released from coal during combustion is readily aerosolized and can become airborne. Airborne mercury may travel globally prior to being deposited onto soil and water. Mercury released in the environment is a persistent and toxic pollutant that may accumulate in the food chain. For example, mercury can be transformed within microorganisms into methylmercury. Consumption of contaminated fish is the major route of human exposure to methylmercury.

Mercury emissions from coal-fired power plants are the subject of governmental regulation. The control of mercury emissions is complicated by the several forms mercury may take within combustion flue gas. For example, at combustion temperatures, mercury is present in flue gas in its elemental form, $Hg^0$, which may be difficult to control because elemental mercury is mostly non-reactive and easily volatized. Mercury reacts with halogens, predominately chlorine, present in coal and released into flue gas during combustion as flue gas cools below 1000° F. Such reactions may convert mercury to its highly reactive, oxidized form, $Hg^{+2}$. Mercury may also be absorbed in fly ash and/or other particulate matter present in the flue gas to form particulate-bound mercury.

Because mercury can take several forms, known control technologies do not effectively control mercury emission for all coal types and for all combustion configurations. Some known mercury control technologies take advantage of mercury's reactivity with carbon and use carbon as a mercury sorbent to remove mercury from flue gas. Carbon may be formed in-situ during the combustion process as a result of incomplete coal combustion or may be injected into mercury-containing flue gas, usually in the form of activated carbon. Further, carbon in the presence of chlorine may increase the oxidation of elemental mercury. In the flue gas, mercury can be converted to its oxidized form, $Hg^{+2}$, and react with chlorine-containing species to form mercury chloride ($HgCl_2$). As such, the extent of mercury oxidation in flue gas is generally higher for coals with a higher chlorine content, such as bituminous coals, and lower for coals with a lower chlorine content, such as low-rank coals.

Particulate matter is another major pollutant produced by fossil fuel combustion. Various pollutant control techniques when implemented primarily for removal of nitrogen oxides (NOx), e.g., low-NOx burners (LNB) and combustion modifications such as air and fuel staging could lead to increased amounts of particulate matter in the exhaust gas at the furnace exit. Higher particulate matter loadings at the furnace exit increase loads placed on particulate control devices such as electrostatic precipitators and baghouses, and can lead to increased particulate matter emissions into atmosphere. Sometimes combustion modifications are implemented in such a way as to intentionally increase the amount of carbon in fly ash. While unburned carbon (also loosely referred to as loss-on-ignition, or LOI) can serve as effective capturing agent for gaseous pollutants such as mercury, increased levels of LOI in fly ash negatively affect fly ash properties and can lead to additional difficulties associated with fly ash collection, use, and disposal.

Combustion fly ash can be used as a cement additive. Stringent requirements exist both in Europe and North America for the maximum allowed carbon content in fly ash sold as a cement additive. The limitations are typically based on the foaming index of the cement. Carbon distribution in fly ash as a function of ash particle size is usually not uniform. Depending on the grinding characteristics of the coal fuel, unburned carbon content can be higher in the larger ash particles (50 to 200 microns or larger), because these particles are generated as a result of incomplete combustion of the largest coal particles. Conversely, typical size of activated carbon sorbent particles is about 3 to 20 microns because it is advantageous to increase particle surface area and improve gas-solid contact for higher removal efficiency. Therefore, depending on plant configuration and operation, high carbon fractions can be presented mostly in larger fly ash particles, or smaller particles, or both. Most often, the highest amounts of captured mercury are associated with particles having high carbon content. There is growing concern about re-use of mercury-laden fly ash, because captured mercury can later escape.

Efficiencies of most available mercury emission control technologies depend on the mercury speciation in flue gas. Oxidized mercury is water-soluble and may be removed from flue gas using known wet desulfurization systems (wet scrubbers). At least some particulate-bound mercury may be removed from flue gas using known particulate collection systems. Elemental mercury is more difficult to remove than oxidized mercury and/or particulate-bound mercury because elemental mercury is unreactive and, as such, cannot be removed from flue gas with wet desulfurization systems or particulate collection system.

In some known systems, because the concentration of mercury in the flue gas is very small (typically less than 10 parts per billion or ppb), diffusion of mercury from the surrounding flue gases may limit the mercury removal process. Most of the flue gases produced in known systems flow in substantially laminar flow patterns and are characterized by slow diffusion rates. Because of the flow characteristics of the flue gas, some known mercury emission reduction systems have attempted to optimize the use of the sorbent by modifying the number and design of sorbent injection lances to achieve sorbent coverage within the flue duct.

BRIEF DESCRIPTION OF THE INVENTION

In one aspect, a method of reducing particulate matter and mercury emissions in a combustion flue gas emitted from a combustion unit. The method includes combusting a fuel resulting in generation a flue gas flow, the flue gas flow containing mercury and carbon-containing fly ash particles, cooling the flue gas flow within a duct, and positioning a flow conditioning apparatus within the duct. The method also includes enhancing a reaction rate of the mercury and carbon-containing fly ash particles by directing the flue gas flow through the flow conditioning apparatus to mix the carbon-containing fly ash particles and mercury within the flue gas flow and facilitate at least one of oxidation of the mercury and binding the mercury to the carbon-containing fly ash particles. The method further includes collecting a portion of the carbon-containing fly ash particles in the flow conditioning apparatus, and directing the flue gas flow to a particulate collection device to remove the remaining portion of the fly ash particles from flue gas flow.

In another aspect, a pollution reduction system for a combustion unit is provided. The combustion unit includes a combustion zone configured to generate a flue gas flow that includes at least carbon-containing fly ash particles and mercury. The pollution reduction system includes a particulate control device, a duct configured to channel the flue gas flow from the combustion zone to the particulate control device, with the duct coupled to the particulate control device, and a flow conditioning apparatus positioned upstream of the particulate control device. The flow conditioning device is located at least partially inside the duct. The flow conditioning device includes a first portion positioned inside the duct, and a second portion located below the first portion. The first portion includes a plurality of vanes, and the second portion includes a particle collection chamber positioned below the plurality of vanes.

In another aspect, a combustion power plant is provided. The power plant includes a combustion furnace including a combustion zone configured to generate a flue gas flow that includes at least carbon-containing fly ash particles and mercury, a duct coupled to the combustion zone for channeling the flue gas therethrough, a particulate control device coupled to the duct, and a flow conditioning apparatus positioned upstream of the particulate control device. The flow conditioning device is located at least partially inside the duct. The flow conditioning device includes a first portion positioned inside the duct, and a second portion located below the first portion. The first portion includes a plurality of vanes, and the second portion includes a particle collection chamber positioned below the plurality of vanes.

DETAILED DESCRIPTION OF THE INVENTION

Figure 1:
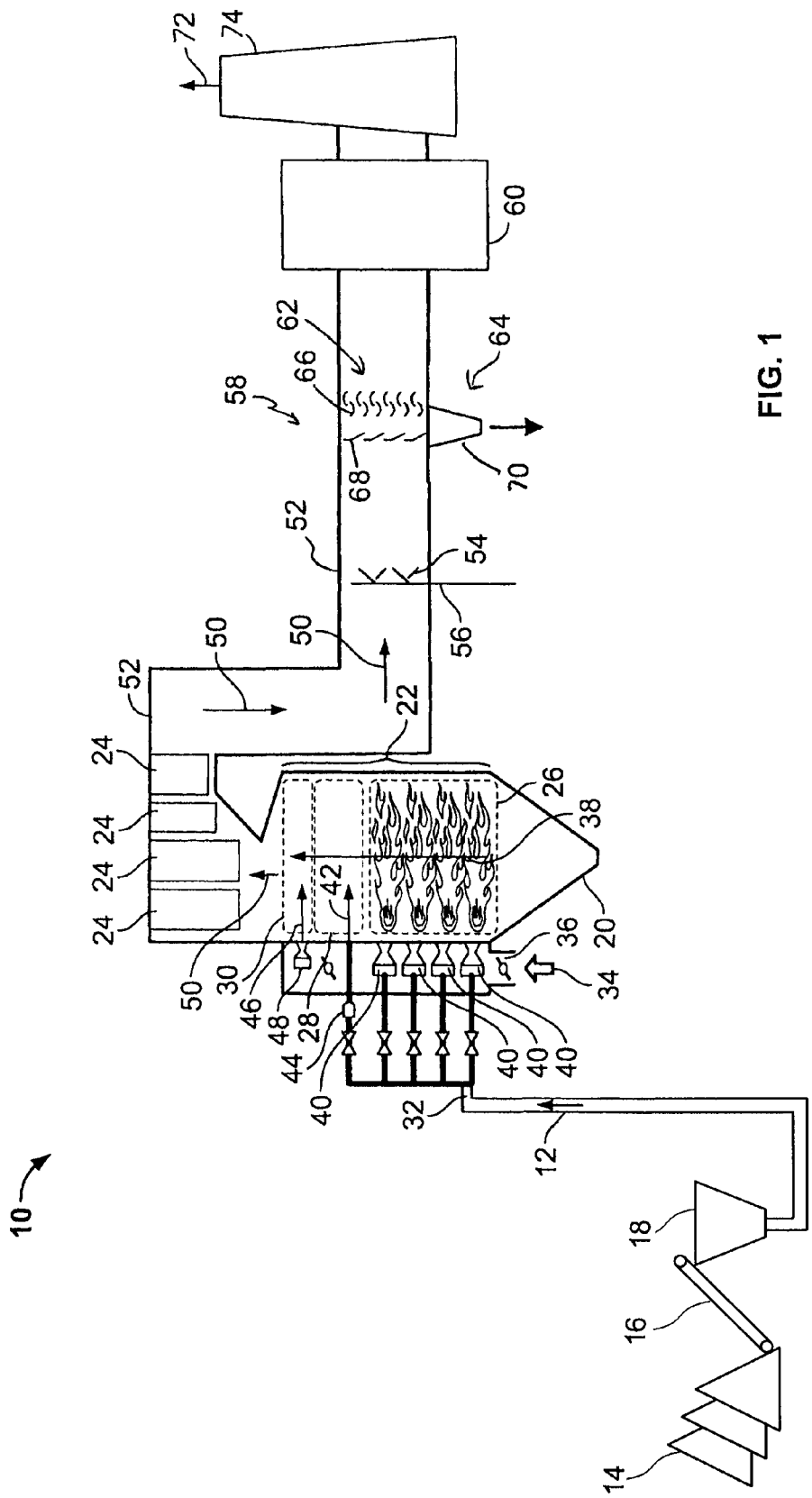
FIG. 1 is a schematic view of an exemplary power plant system.

FIG. 1 is a schematic view of an exemplary power plant system 10. In the exemplary embodiment, system 10 is supplied with fuel 12 in the form of coal 14. More specifically, the coal 14 can be bituminous coal, lignite coal, and/or any other suitable coal that enables system 10 to function as described herein. Alternatively, fuel 12 may be any other suitable fuel, such as, but not limited to, oil, natural gas, biomass, waste, or any other fossil or renewable fuel. In the exemplary embodiment, coal 14 is supplied to system 10 by a coal supply means 16, for example, a conveyor, and is processed in a coal mill 18. Coal 14 is pulverized in coal mill 18 to form coal particles having a predetermined and selectable fineness.

System 10 includes a coal-fired furnace 20 that includes a combustion zone 22 and heat exchangers 24. Combustion zone 22 includes a primary combustion zone 26, a reburning zone 28, and a burnout zone 30. In another embodiment, combustion zone 22 does not include reburning zone 28 and/or burnout zone 30 such that furnace 20 is a "straight fire" furnace. Fuel 12 enters furnace 20 through a fuel inlet 32, and air 34 enters furnace 20 through an air inlet 36. In primary combustion zone 26, the fuel/air mixture is ignited to create combustion gases 38.

Fuel 12 and air 34 are supplied to primary combustion zone 26 through one or more main injectors and/or burners 40. Main burners 40 receive a predetermined amount of fuel 12 from fuel inlet 32 and a predetermined quantity of air 34 from air inlet 36. Burners 40 may be tangentially arranged in each corner of furnace 20, wall-fired, or have any other suitable arrangement that enables furnace 20 to function as described herein. Within primary combustion zone 26, combustion gases 38 are formed, and may include, but is not limited to, carbon, carbon containing fly ash, carbon dioxide, carbon monoxide, water, hydrogen, nitrogen, sulfur, chlorine, and/or trace metals, for example, mercury. Combustion products not contained in combustion gases 38 may include solids and may be discharged from furnace 20 as waste.

Combustion gases 38 flow from primary combustion zone 26 towards reburning zone 28. In reburning zone 28, a predetermined amount of reburn fuel 42 is injected through a reburn fuel inlet 44. Reburn fuel 42 is supplied to inlet 44 from fuel inlet 32. Although reburn fuel 42 and fuel 12 are shown as originating at a common source, such as fuel inlet 32, reburn fuel 42 may be supplied from a source other than fuel inlet 32, and/or may be a different type of fuel than fuel 12. For example, fuel 12 entering through fuel inlet 32 may be, but is not limited to, pulverized coal, and reburn fuel 42 entering through a separate reburn fuel inlet may be natural gas. In the exemplary embodiment, the amount of reburn fuel 42 injected is based on a desired stoichiometric ratio within reburning zone 28. More specifically, in the exemplary embodiment, the amount of reburn fuel 42 creates a fuel-rich environment in reburning zone 28. As such, less of the carbon in fuel 12 and in reburn fuel 42 is combusted, which facilitates increasing the Loss on Ignition (LOI) and facilitates creating a more reactive, high-carbon content fly ash entrained in combustion gases 38.

Combustion gases 38 flow from reburning zone 28 into burnout zone 30. Overfire air 46 is injected into burnout zone 30 through an overfire air inlet 48 and, a predetermined quantity of overfire air 46 is injected into burnout zone 30. In the exemplary embodiment, overfire air inlet 48 is in flow communication with air inlet 36. In another embodiment, overfire air 46 may be supplied to furnace 20 through an inlet 48 that is separate from air inlet 36. The quantity of overfire air 46 is selected based on a desired stoichiometric ratio within burnout zone 30. More specifically, in the exemplary embodiment, the quantity of overfire air 46 is selected to facilitate completing combustion of fuel 12 and reburn fuel 42, which facilitates reducing pollutants in combustion gases 38, such as, but not limited to, nitrogen oxides (NOx), and/or carbon monoxide (CO).

Flue gas 50 exits combustion zone 22 and may include carbon, carbon-containing fly ash, carbon dioxide, carbon monoxide, water, hydrogen, nitrogen, sulfur, chlorine, and/or trace metals, for example, mercury. Flue gas 50 exits combustion zone 22 and enters heat exchangers 24. Heat exchangers 24 transfer heat from flue gas 50 to a working fluid in a known manner. More specifically, the heat transfer heats the fluid, such as, for example, heating water to generate steam. The heated fluid, for example, the steam, is used to generate power, typically by known power generation methods and systems, such as, for example, a steam turbine. Power may be supplied to a power grid or any suitable power outlet.

Flue gas 50 flows from heat exchangers 24 to a duct or convective pass 52. As flue gas 50 flows through duct 52, the gas 50 is cooled to a temperature that is less than the combustion temperature. More specifically, in the exemplary embodiment, flue gas 50 within duct 52 is cooled convectively, conductively, and/or radiantly by ambient air and/or any other suitable cooling means, including evaporative cooling. In the exemplary embodiment, the cooling fluid at least partially surrounds duct 52 to facilitate cooling flue gases 50 therein. In an alternative embodiment, the cooling fluid is vented into duct 52 to facilitate cooling flue gases 50. In another alternative embodiment, system 10 includes cooling fluid at least partially surrounding duct 52 and cooling fluid vented into duct 52 to facilitate cooling flue gases 50. In the exemplary embodiment, flue gas 50 is cooled to a temperature that enables mercury to react with the carbon in the fly ash, for example, a temperature below 350° F. As such, mercury is oxidized, and captured by, carbon, chlorine, and/or any other suitable mercury-reactive elements and/or compounds in flue gas 50.

In the exemplary embodiment, a predetermined amount of sorbent 54 is injected into duct 52 to react with flue gas 50. Sorbent 54 is injected into duct 52 through a sorbent injector 56. In an alternate embodiment, sorbent 54 is not injected to duct 52, but rather mercury entrained in flue gas 50 reacts only with elements and/or compounds present within flue gas 50. The sorbent 54 is selected to facilitate oxidation and/or capture of mercury, for example, activated carbon. Alternatively, sorbent 54 may be any other suitable element and/or compound that facilitates oxidation and/or capture of mercury.

In the exemplary embodiment, a flow conditioning apparatus 58 is positioned within duct 52 downstream from sorbent injector 56, and upstream of a particulate control device 60. Flow conditioning apparatus 58 includes a first portion 62 and a second portion 64. First portion 62 includes a plurality of vanes 66 mounted within duct 52 that alter the flow of flue gas 50 to increase the mixing of smaller fly ash particles and/or sorbent particles 54 with flue gas 50 to improve the removal of mercury from flue gas 50. Some of the vanes can be adjustable vanes 68 that are capable of changing the angle of adjustable vanes 68 in relation to the flow of flue gas 50 to permit tuning of the efficiency of adjustable vanes 68 in response to changing operating characteristics of the combustion furnace, fuel quality, and sorbent characteristics.

Second portion 64 includes a particle collection chamber 70 positioned below vanes 66 of first portion 62. The impingement on vanes 66 turbulence created in the flow of flue gas 50 by vanes 66 causes larger and/or heavier fly ash particles to drop out of the flow of flue gas 50 and be collected in collection chamber 70. The larger and heavier fly ash particles usually contain a high proportion of unburned carbon. The removal of these larger particles in flow conditioning apparatus 58 reduces the total particulate matter mass collected by particulate control device 60 and decreases the carbon content of the fly ash collected in particulate control device 60. In another embodiment, an electric field can be used in conjunction with vanes 66 to enhance the removal of particulate matter by flow conditioning apparatus 58 In another embodiment, an electric field can be used in conjunction with vanes 66 to enhance the removal of particulate matter by flow conditioning apparatus 58. In an alternative embodiment that does not include sorbent injector 56, flow conditioning apparatus 58 is positioned downstream from heat exchangers 24, and upstream of particulate control device 60. Further, in the exemplary embodiment, particulate control device 60 may be, for example, but not limited to, an electrostatic precipitator, a cyclone, or a baghouse, used to collect particles including those containing oxidized mercury and/or particulate-bound mercury.

In an alternative embodiment, system 10 may also include an ash burnout unit (not shown) and/or a mercury collection unit (not shown) coupled to particulate control device 60 and/or collection chamber 70. The ash burnout unit facilitates the removal of carbon from collected particle matter, causing desorption of mercury from the fly ash. The mercury collection unit is optionally coupled to the ash burnout unit and may include activated carbon, or any other suitable reagent, for capturing mercury desorbed by the ash burnout unit. System 10 may further include a wet scrubber (not shown) and/or a dry scrubber (not shown) positioned downstream of particulate control device 60 for removing oxidized mercury and/or particulate-bound mercury from flue gas 50 and/or for removing other compounds and/or elements from flue gas 50, such as, for example, sulfur dioxide. At least partially decontaminated flue gas 50 exits system 10 as exhaust gases 72 discharged through an exhaust stack 74.

During operation of system 10, fuel 12, air 34, reburn fuel 42, and/or overfire air 46 are injected and combusted in combustion zone 22 to form flue gases 50 that include, but are not limited to, carbon, carbon containing fly ash, carbon dioxide, carbon monoxide, water, hydrogen, nitrogen, sulfur, chlorine, and/or trace metals, for example, mercury. Flue gases 50 flow from combustion zone 22 through heat exchangers 24, and into duct 52. In the exemplary embodiment, the flow of flue gases 50 through duct 52 is substantially laminar, except where the geometry of duct 52 causes minor turbulence.

As the gases 50 cool in duct 52, mercury reacts with carbon within the flue gases 50 to form oxidized mercury. Mercury may also react with elements and/or compounds within flue gas 50 to form particulate-bound mercury. In the exemplary embodiment, sorbent 54 is injected into cooling flue gas 50 such that mercury within flue gas 50 reacts with sorbent 54 to form oxidized and/or particulate bound mercury. For reactions to occur between mercury and other reactive elements and/or compounds within flue gas 50 and/or sorbent 54, mercury must collide with such reactive particles. The rate of mercury oxidation is affected by the number of collisions between mercury and other reactive particles in flue gas 50 and/or sorbent 54. Further, mercury reactions occur at temperatures cooler than the combustion temperature, such as, but not limited to, temperatures below 350° F. Adsorption of mercury on a surface of a carbon-containing particle is relatively fast process, and, as such, mercury in the nearest proximity to carbon containing particles is adsorbed first.

In the exemplary embodiment, vanes 66 create a substantially turbulent flow in the flow of flue gas 50. Turbulence in flue gas 50 increases the number of collisions between mercury and other particles, which increases the mercury chemical reaction rate within flue gas 50 and/or between flue gas 50 and sorbent 54. As such, as the number of collisions between mercury and other particles increases, the possibility that mercury will oxidize or become particulate-bound also increases. As a result of the collisions and reactions caused by turbulence in flue gas 50, the percentage of oxidized mercury and particulate-bound mercury in flue gas 50 is increased while the percentage of elemental mercury in flue gas 50 is decreased.

The above-described method and apparatus facilitates removing mercury from combustion exhaust gas by improving natural mercury capture on fly ash and improving sorbent utilization. The diffusion rate of mercury atoms to carbon particles within the flue gas is greater in substantially turbulent flow in comparison to a substantially laminar flow; therefore, increasing flue gas flow turbulence facilitates improving mercury absorption on carbon within the flue gas, and, more specifically, on the carbon-containing fly ash within the flue gas. Furthermore, the efficiency of mercury removal using sorbent injection is increased when the sorbent is substantially uniformly distributed across a flue duct cross-section because the uniform distribution facilitates utilizing the mercury removal capacity of the sorbent. Turbulence in the flue gas flow facilitates increasing the uniformity of the distribution of the sorbent across the flue duct cross-section. Turbulence in the flue gas flow facilitates decreasing the requirements for the amount of sorbent injected for mercury control by facilitating improving the mixing of carbon-contain fly ash, sorbent, and mercury within the flue gas flow. Because turbulence in the flue gas flow facilitates increasing mercury absorption on sorbent, the sorbent is utilized more effectively, and the amount of sorbent to achieve the same mercury removal efficiency is decreased.

Further, because flow turbulization also facilitates improving mercury absorption on carbon-containing fly ash, requirements for sorbent injection are reduced in comparison to coal-fired power plants that do not include a flow conditioning apparatus for turbulizing the flue gas flow. The efficiency of natural mercury capture on carbon-containing fly ash and the efficiency of sorbent utilization can be increased by introducing turbulent mixing of fly ash, sorbent, and/or mercury-containing flue gas. Such mixing at the location downstream of sorbent injection and upstream of particulate control device facilitates increasing the amount of mercury the particulate control device removes from the flue gas flow.

In addition, the above-described method and apparatus provides for increased efficiency of gaseous pollutant (such as mercury) removal, while simultaneously improving operation of the particulate collection system and improving characteristics of the fly ash collected by particulate collection device 60. The above-described method and apparatus facilitates tuning of the combustion process to reduce amount of carbon contained in the fly ash while maintaining or improving gaseous pollutant removal efficiency, achieving better combustion efficiency and improving characteristics of fly ash collected by particulate control device 60. Further, the above-described method and apparatus provide at least two separate streams of collected particulate matter: 1) the coarser fraction removed by the flow conditioning apparatus 58, and 2) the finer fraction collected by particulate control device 60. The coarser fraction includes a significant portion of the total unburned carbon and potentially can be used as a fuel. The finer fraction has a reduced level of unburned carbon, improving its desirable characteristics such as carbon content, foam index, flowability, etc.

Exemplary embodiments of a method and apparatus for removing particulate matter and mercury from combustion exhaust gas are described above in detail. The method and apparatus are not limited to the specific embodiments described herein, but rather, components of the method and apparatus may be utilized independently and separately from other components described herein. For example, the flow conditioning apparatus may also be used in combination with other pollution control systems and methods, and is not limited to practice with only the coal-fired power plant as described herein. Rather, the above-described method and apparatus can be implemented and utilized in connection with many other pollutant emission reduction applications.

While the invention has been described in terms of various specific embodiments, those skilled in the art will recognize that the invention can be practiced with modification within the spirit and scope of the claims.

What is claimed is:

1. A method of reducing particulate matter and mercury emissions in a combustion flue gas emitted from a combustion unit, said method comprising:
combusting a fuel resulting in generation of a flue gas flow, the flue gas flow comprising mercury and carbon-containing fly ash particles;
cooling the flue gas flow within a duct;
positioning a flow conditioning apparatus within the duct, wherein the flow conditioning apparatus includes a plurality of vanes within the duct;
enhancing a reaction rate of the mercury and carbon-containing fly ash particles by directing the flue gas flow through the flow conditioning apparatus to mix the carbon-containing fly ash particles and mercury within the flue gas flow and facilitate at least one of oxidation of the mercury and binding the mercury to the carbon-containing fly ash particles;
collecting a portion of the carbon-containing fly ash particles in the flow conditioning apparatus; and
directing the flue gas flow to a particulate collection device to remove the remaining portion of the fly ash particles from flue gas flow.

2. A method in accordance with claim 1, further comprising adding a sorbent to the flue gas flow, the sorbent reactive with mercury.

3. A method in accordance with claim 2, wherein adding a sorbent to the flue gas flow comprises adding a sorbent to the flue gas flow upstream from the flow conditioning apparatus.

4. A method in accordance with claim 1, wherein the flow conditioning apparatus comprises a first portion and a second portion that extends from the first portion, the plurality of vanes are positioned within the first portion, said method further comprises positioning a particle collection chamber below the plurality of vanes.

5. A method in accordance with claim 1, wherein at least one of the plurality of vanes is an adjustable vane.

6. A method in accordance with claim 1, wherein collecting a portion of the carbon-containing fly ash particles in the flow conditioning apparatus comprises collecting a portion of the carbon-containing fly ash particles that are larger in size than the carbon-containing fly ash particles in the non-collected portion of the carbon-containing fly ash particles.

7. A method in accordance with claim 1, further comprising recycling the carbon-containing fly ash particles collected in the flow conditioning apparatus as fuel for the combustion unit.

8. A pollution reduction system for a combustion unit, the combustion unit comprising a combustion zone configured to generate a flue gas flow that includes at least carbon-containing fly ash particles and mercury, said pollution reduction system comprising:
a particulate control device;
a duct configured to channel the flue gas flow from the combustion zone to said particulate control device, said duct coupled to said particulate control device; and
a flow conditioning apparatus positioned upstream of said particulate control device, said flow conditioning device located at least partially inside said duct, said flow conditioning device comprising a first portion positioned inside said duct, and a second portion located below said first portion, said first portion comprising a plurality of vanes, said second portion comprising a particle collection chamber positioned below said plurality of vanes.

9. A pollution reduction system in accordance with claim 8, further comprising a sorbent injector located inside said duct upstream from said particle collection device.

10. A pollution reduction system in accordance with claim 9, wherein said sorbent injector is configured to inject a sorbent into the flue gas flow.

11. A pollution reduction system in accordance with claim 9, wherein said flow conditioning apparatus is positioned between said sorbent injector and said particle collection device.

12. A pollution reduction system in accordance with claim 8, wherein at least one of said plurality of vanes is adjustable.

13. A pollution reduction system in accordance with claim 8, wherein said plurality of vanes are configured to mix the carbon-containing fly ash particles within the flue gas flow to cause the mercury within the flue gas flow to collide with the carbon-containing fly ash particles to facilitate at least one of oxidation of the mercury and binding the mercury to the carbon-containing fly ash particles.

14. A combustion power plant comprising:
   a combustion furnace comprising a combustion zone configured to generate a flue gas flow that includes at least carbon-containing fly ash particles and mercury;
   a duct coupled to said combustion zone for channeling said flue gas therethrough;
   a particulate control device coupled to said duct;
   a flow conditioning apparatus positioned upstream of said particulate control device, said flow conditioning device located at least partially inside said duct, said flow conditioning device comprising a first portion positioned inside said duct, and a second portion located below said first portion, said first portion comprising a plurality of vanes, said second portion comprising a particle collection chamber positioned below said plurality of vanes.

15. A power plant in accordance with claim 14, further comprising a sorbent injector located inside said duct upstream from said particle collection device.

16. A power plant in accordance with claim 15, wherein said sorbent injector is configured to inject a sorbent into the flue gas flow.

17. A power plant in accordance with claim 15, wherein said flow conditioning apparatus is positioned between said sorbent injector and said particle collection device.

18. A power plant in accordance with claim 14, wherein at least one of said plurality of vanes is adjustable.

19. A power plant in accordance with claim 14, wherein said plurality of vanes are configured to mix said carbon-containing fly ash particles within said flue gas flow to cause said mercury within said flue gas flow to collide with said carbon-containing fly ash particles to facilitate at least one of oxidation of said mercury and binding said mercury to said carbon-containing fly ash particles.

20. A power plant in accordance with claim 14, wherein said flow conditioning apparatus is configured to collect a portion of said carbon-containing fly ash particles in said flue gas flow.

* * * * *